(12) United States Patent
Lee et al.

(10) Patent No.: US 7,430,111 B2
(45) Date of Patent: Sep. 30, 2008

(54) MOUNTING STRUCTURE FOR DISPLAY UNIT IN REFRIGERATOR

(75) Inventors: Ik Kyu Lee, Changwon-si (KR); Seung Jin Oh, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/275,389

(22) Filed: Dec. 29, 2005

(65) Prior Publication Data

US 2006/0145576 A1    Jul. 6, 2006

(30) Foreign Application Priority Data

Jan. 4, 2005   (KR) ...................... 10-2005-0000625
Jan. 6, 2005   (KR) ...................... 10-2005-0001386

(51) Int. Cl.
*H05K 7/16* (2006.01)
(52) U.S. Cl. .................... 361/681; 361/725; 312/406
(58) Field of Classification Search ................ 361/681, 361/725; 312/406
See application file for complete search history.

(56) References Cited

U.S. PATENT DOCUMENTS

| | | | | |
|---|---|---|---|---|
| 4,387,578 A | * | 6/1983 | Paddock | ........................ 62/127 |
| 4,718,740 A | * | 1/1988 | Cox | ........................ 312/223.2 |
| 5,281,018 A | * | 1/1994 | Cullinan | ................... 312/223.2 |
| 6,131,812 A | * | 10/2000 | Schneider | ..................... 235/385 |
| 6,483,695 B1 | * | 11/2002 | Hartstein | ...................... 361/680 |
| 6,692,093 B1 | * | 2/2004 | Park et al. | ................. 312/405.1 |
| 6,873,262 B2 | * | 3/2005 | Midlang | ...................... 340/585 |
| 2006/0210059 A1 | * | 9/2006 | Kosugi | ................... 379/433.13 |

FOREIGN PATENT DOCUMENTS

| KR | 2002009818 A | * | 2/2002 |
|---|---|---|---|
| KR | 10 2002-0057634 | | 7/2002 |
| KR | 10 2004-0008041 | | 1/2004 |

* cited by examiner

*Primary Examiner*—Lisa Lea-Edmonds
*Assistant Examiner*—Ingrid Wright
(74) *Attorney, Agent, or Firm*—Fish & Richardson P.C.

(57) ABSTRACT

A mounting structure for a display unit in a refrigerator includes an accommodating space formed by depressing a portion of a front surface of a door, an installation space formed in the door to communicate with a portion of the accommodating space, a display unit retractably mounted to the accommodating space to display a variety of information and receive a plurality of operating signals, a first lead wire of which one end is led into the installation space through the door, and a second lead wire of which one end is connected to the display unit and the other end is led into the installation space and connected to the first lead wire. With such an arrangement the external appearance of the refrigerator can be improved, the durability and operational reliability of the refrigerator can be ensured, and the usability can also be enhanced.

21 Claims, 8 Drawing Sheets

MOUNTING STRUCTURE FOR DISPLAY UNIT IN REFRIGERATOR

BACKGROUND OF THE INVENTION

1. Field of Invention

The present invention relates to a refrigerator, and more particularly, to a mounting structure for a display unit in a refrigerator which is mounted to a front surface of a refrigerator door to display a variety of information to the outside and to receive operating signals.

2. Description of the Prior Art

Refrigerators are household appliances for refrigerating or freezing foods and then storing the foods at a fresh state for a long while. Recently, a multi-purpose refrigerator having an additional function of allowing a user to watch television or connect to the Internet in addition to a unique function of storing foods therein has been placed on the market.

Figure 1:
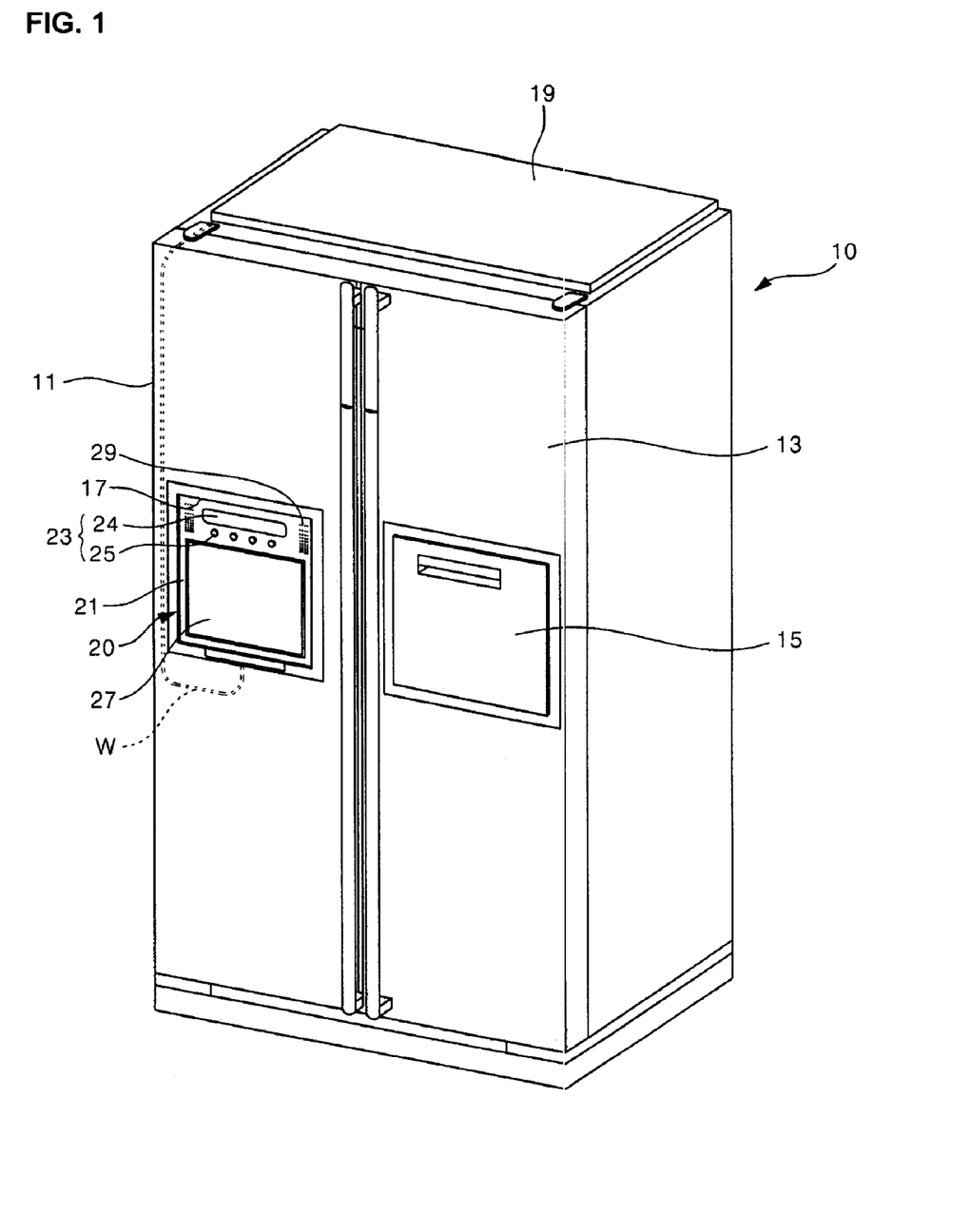
FIG. 1 is a perspective view of a refrigerator mounted with a related art display unit.
Figure 2:
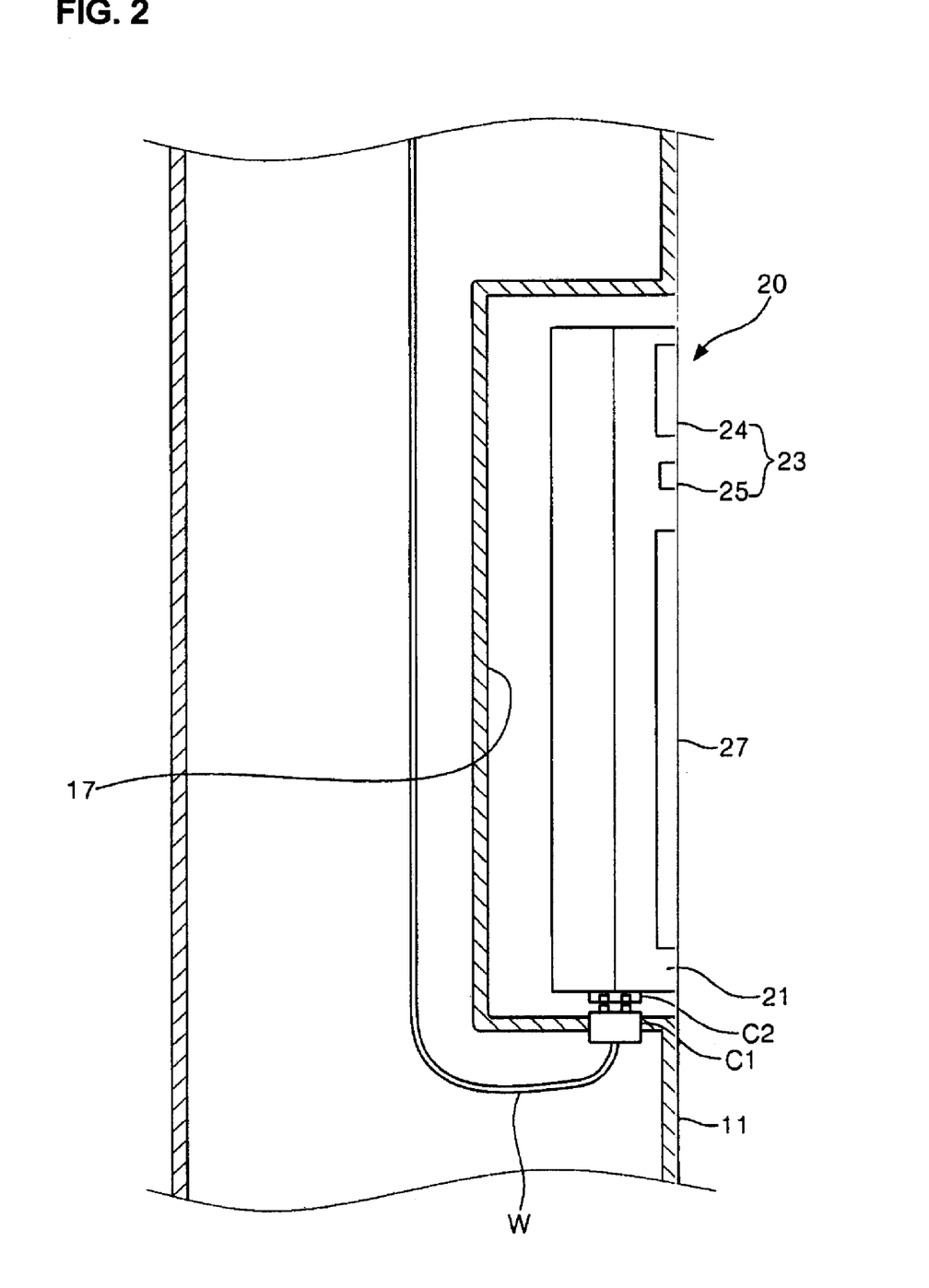
FIG. 2 is a sectional view showing a main portion of a mounting structure for the display unit shown in FIG. 1.

FIG. 1 shows an external appearance of a refrigerator mounted with a related art display unit, and FIG. 2 shows a side section of the display unit shown in FIG. 1.

As shown in these figures, a main body 10 of the refrigerator is provided with a certain storage space divided into a refrigerating chamber (not shown) and a freezing chamber (not shown). The freezing and refrigerating chambers are selectively opened or closed by a freezing chamber door 11 and a refrigerating chamber door 13, respectively. The freezing and refrigerating chamber doors 11 and 13 are installed to be pivoted horizontally on both side ends of the main body 10, respectively. The freezing and refrigerating chamber doors 11 and 13 are supported on the main body 10 to be pivoted on a pair of hinges h1 and h2.

A home bar (not shown) is provided in a portion of the refrigerating chamber door 13. The home bar is selectively opened or closed by a home bar door 15. The home bar door 15 is installed to be pivoted vertically on a specific point on a front surface of the refrigerating chamber door 13.

An accommodating space 17 is provided at a position on a front surface of the freezing chamber door 11. A display unit 20 which will be explained later is received in the accommodating space 17. The accommodating space 17 takes the shape as a flat box with an open front face to correspond to the shape of the display unit 20.

Meanwhile, a main control unit 19 is provided on a top surface of the main body 10. The main control unit 19 serves to control the operation of the refrigerator. One end of a lead wire W is connected to the main control unit 19, and the other end of the lead wire W is connected to a male connector C1 provided at a position on a lower side of the accommodating space 17 through the hinge h1 and the freezing chamber door 11.

The display unit 20 is retractably mounted to the accommodating space 17. The display unit 20 is also connected to the main control unit 19 by means of the lead wire W1. To this end, a female connector C2 to be coupled with the male connector C1 is provided on a lower surface of the display unit 20. The display unit 20 receives electric power and a variety of electrical signals from the main control unit 19 through the lead wire W.

A casing 21 defines an external appearance of the display unit 20. A plurality of openings or holes are formed in a front surface of the casing 21. A predetermined installation space is provided in the casing 21.

A control unit 23 and a communication unit 27 are installed in the installation space of the casing 21. The control unit 23 and the communication unit 27 are exposed to the outside through the openings and/or holes formed in the front surface of the casing 21.

The control unit 23 is to operate the refrigerator. The control unit 23 includes a display part 24 for displaying a variety of information regarding the refrigerator operation to the outside and an input part 25 for receiving a variety of operating signals needed to operate the refrigerator.

The communication unit 27 is to output a variety of images or sounds or connect to the Internet. The communication unit 27 receives signals from the outside to output images or to display information about the Internet to the outside and simultaneously receives operating signals for the image output or information display in touch screen mode.

A plurality of speaker holes 29 are formed at positions on the front surface of the casing 21. The speaker holes 29 are to transmit sounds outputted from the control unit 23 and/or the communication unit 27 to the outside. The speaker holes 29 are formed at both sides of the control unit 23 to be spaced apart from each other at a predetermined interval.

Although it has not illustrated in the figures, a fixing means for preventing the display unit 20 from being inadvertently withdrawn from the accommodating space 17 is provided. The fixing means selectively allows the display unit 20 to retractably installed in the accommodating space 17.

However, the conventional mounting structure for a display unit in a refrigerator so configured has the following problems.

As described above, the connectors C1 and C2 for connecting the main control unit 19 to the display unit 20 are provided at the lower side of the accommodating space 17 and the lower surface of the display unit 20, respectively. Therefore, when the display unit 20 is withdrawn from the accommodating space 17, the connectors C1 and C2 are exposed to the outside. As a result, an overall aesthetic sense of the refrigerator may be deteriorated Further, when the display unit 20 has been withdrawn from the accommodating space 17, the connectors C1 and C2 exposed to the outside may be damaged. Therefore, there is a problem in that the display unit 20 may be incorrectly operated or a user may receive an electric shock by electricity leaked though the damaged connectors C1 and C2.

Even though the connectors C1 and C2 are positioned as described above, the display unit 20 can be withdrawn from or accommodated into the accommodating space 17. However, the display unit 20 should be fixed at a certain position in the accommodating space 17 to use the display unit 20. As a result, there is a possibility that a field of view of the display unit 20 cannot be ensured depending on positions of the user.

SUMMARY OF THE INVENTION

The present invention is conceived to solve the aforementioned problem in the prior art. Accordingly, an object of the present invention is to provide a mounting structure for a display unit in a refrigerator, which is configured such that components for supplying electric power to or transmitting a plurality of electric signals to the display unit can be prevented from being exposed to the outside.

Another object of the present invention is to provide a mounting structure for a display unit in a refrigerator, which is configured such that components for supplying electric power to or transmitting a plurality of electric signals to the display unit can be prevented from being damaged.

A further object of the present invention is to provide a mounting structure for a display unit in a refrigerator wherein a field of view can be easily ensured regardless of positions of a user.

According to an aspect of the present invention for achieving the object, there is provided a mounting structure for a display unit in a refrigerator, comprising an accommodating space formed by depressing a portion of a front surface of a door, an installation space formed in the door to communicate with a portion of the accommodating space, a display unit retractably mounted to the accommodating space to display a variety of information and receive a plurality of operating signals, a first lead wire of which one end is led into the installation space through the door, and a second lead wire of which one end is connected to the display unit and the other end is led into the installation space and connected to the first lead wire.

Preferably, the installation space is formed by further depressing a portion of a bottom surface defining the accommodating space toward the interior of the door.

The mounting structure of the present invention may further comprise a link mechanism for guiding a withdrawal or accommodation motion of the display unit and for supporting the display unit withdrawn from the accommodating space to be tiltable at a predetermined angle.

The link mechanism may include a bracket fixed to a bottom surface defining the accommodating space, a mounting plate fixed to a rear surface of the display unit, and a link member of which both ends are pivotally connected to a front surface of the bracket and a rear surface of the mounting plate, respectively.

Further, the bracket may cover a front face of the installation space communicating with the accommodating space.

Preferably, an outlet opening through which an end of the second lead wire is led out is formed at a position of the mounting plate, a channel through which the second lead wire led out through the outlet opening passes is formed through the link member, and an inlet opening through which the second lead wire passing through the channel of the link member is led into the installation space is formed in the bracket.

More preferably, mating connectors are provided at ends of the first and the second lead wires led into the installation space, respectively.

According to another aspect of the present invention, there is provided a mounting structure for a display unit in a refrigerator, comprising an accommodating space formed by depressing a portion of a front surface of a door; a display unit retractably mounted to the accommodating space for displaying a variety of information and receiving a plurality of operating signals; a link mechanism for guiding a withdrawal or accommodation motion of the display unit and for supporting the display unit withdrawn from the accommodating space to be tiltable at a predetermined angle; a hinge assembly provided in the accommodating space or at a connection portion between the display unit and the link mechanism to impart an external force to the link mechanism in a direction in which the display unit is withdrawn; and a locking means for maintaining the display unit to be accommodated in the accommodating space against the external force from the hinge assembly.

The link mechanism may include a bracket fixed to a bottom surface defining the accommodating space, a mounting plate fixed to a rear surface of the display unit, and a link member of which both ends are pivotally connected to a front surface of the bracket and a rear surface of the mounting plate, respectively.

Further, the hinge assembly may includes a frame fixed to a portion of the bracket or mounting plate, a linearly reciprocating sliding cam installed at a side of the frame, a rotary cam installed at a side of the frame and rotatably reciprocating within a predetermined angular range in cooperation with the linear reciprocation of the sliding cam, and an elastic member provided at a side of the frame to impart a predetermined elastic force to the sliding cam, wherein when the sliding cam is linearly moved in a direction by the elastic force imparted by the elastic member, the link member is rotated in a direction in which the display unit is withdrawn from the accommodating space by the rotary cam rotating about a predetermined direction in cooperation with the liner reciprocation of the sliding cam.

Furthermore, the locking means may include a locking protrusion provided at one of a position on the sliding cam and a corresponding position on the rotary cam, and a locking groove provided at the other of the position on the sliding cam and the corresponding position on the rotary cam such that the locking protrusion is inserted in the locking groove when the display unit is withdrawn from the accommodating space, and the locking protrusion is detached from the locking groove when the display unit is received in the accommodating space.

Preferably, a handle is provided on a lower surface of the display unit, and a lower side of the accommodating space is spaced apart from the lower surface of the display unit by a predetermined distance when the display unit is received in the accommodating space.

According to a further aspect of the present invention, there is provided a mounting structure for a display unit in a refrigerator, comprising an accommodating space formed by depressing a portion of a front surface of a door; an installation space formed in the door to communicate with a portion of the accommodating space; a display unit retractably mounted to the accommodating space to display a variety of information and receive a plurality of operating signals; a first lead wire of which one end is led into the installation space through the door; a second lead wire of which one end is connected to the display unit and the other end is led into the installation space and connected to the first lead wire; a link mechanism for guiding a withdrawal or accommodation motion of the display unit and for supporting the display unit withdrawn from the accommodating space to be tiltable at a predetermined angle; a hinge assembly provided in the accommodating space or at a connection portion between the display unit and the link mechanism to impart an external force to the link mechanism in a direction in which the display unit is withdrawn; and a locking means for maintaining the display unit to be accommodated in the accommodating space against the external force imparted by the hinge assembly.

The link mechanism may include a bracket fixed to a bottom surface defining the accommodating space, a mounting plate fixed to a rear surface of the display unit, and a link member of which both ends are pivotally connected to a front surface of the bracket and a rear surface of the mounting plate, respectively.

Preferably, the installation space is formed by further depressing a portion of a bottom surface defining the accommodating space toward the interior of the door, and the bracket covers a front face of the installation space communicating with the accommodating space.

Preferably, an outlet opening through which an end of the second lead wire is led out is formed at a position of the mounting plate, a channel through which the second lead wire led out through the outlet opening passes is formed through the link member, and an inlet opening through which the second lead wire passing through the channel of the link member is led into the installation space is formed in the bracket.

Preferably, mating connectors are provided at ends of the first and the second lead wires led into the installation space, respectively.

Further, the hinge assembly may include a frame fixed to a portion of the bracket or mounting plate, a linearly reciprocating sliding cam installed at a side of the frame, a rotary cam installed at a side of the frame and rotatably reciprocating within a predetermined angular range in cooperation with the linear reciprocation of the sliding cam, and an elastic member provided at a side of the frame to impart a predetermined elastic force to the sliding cam, wherein when the sliding cam is linearly moved in a direction by the elastic force imparted by the elastic member, the link member is rotated in a direction in which the display unit is withdrawn from the accommodating space by the rotary cam rotating about a predetermined direction in cooperation with the liner reciprocation of the sliding cam.

Furthermore, the locking means may include a locking protrusion provided at one of a position on the sliding cam and a corresponding position on the rotary cam, and a locking groove provided at the other of the position on the sliding cam and the corresponding position on the rotary cam such that the locking protrusion is inserted in the locking groove when the display unit is withdrawn from the accommodating space, and the locking protrusion is detached from the locking groove when the display unit is received in the accommodating space.

Preferably, a handle is provided on a lower surface of the display unit, and a lower side of the accommodating space is spaced apart from the lower surface of the display unit by a predetermined distance when the display unit is received in the accommodating space.

According to a mounting structure for a display unit in a refrigerator of the present invention so constructed, the lead wire and the connector for connecting the display unit to the main control unit of the refrigerator is prevented from being exposed and, therefore, damaged and the angle of view may be easily insured depending on the position of the user.

BRIEF DESCRIPTION OF THE DRAWINGS

The above and other objects, features and advantages of the present invention will be apparent from the following description of preferred embodiments given in conjunction with the accompanying drawings, in which.

DETAILED DESCRIPTION OF THE PREFERRED EMBODIMENT

Hereinafter, preferred embodiments of a mounting structure for a display unit in a refrigerator according to the present invention will be described in detail with reference to the accompanying drawings.

Figure 3:
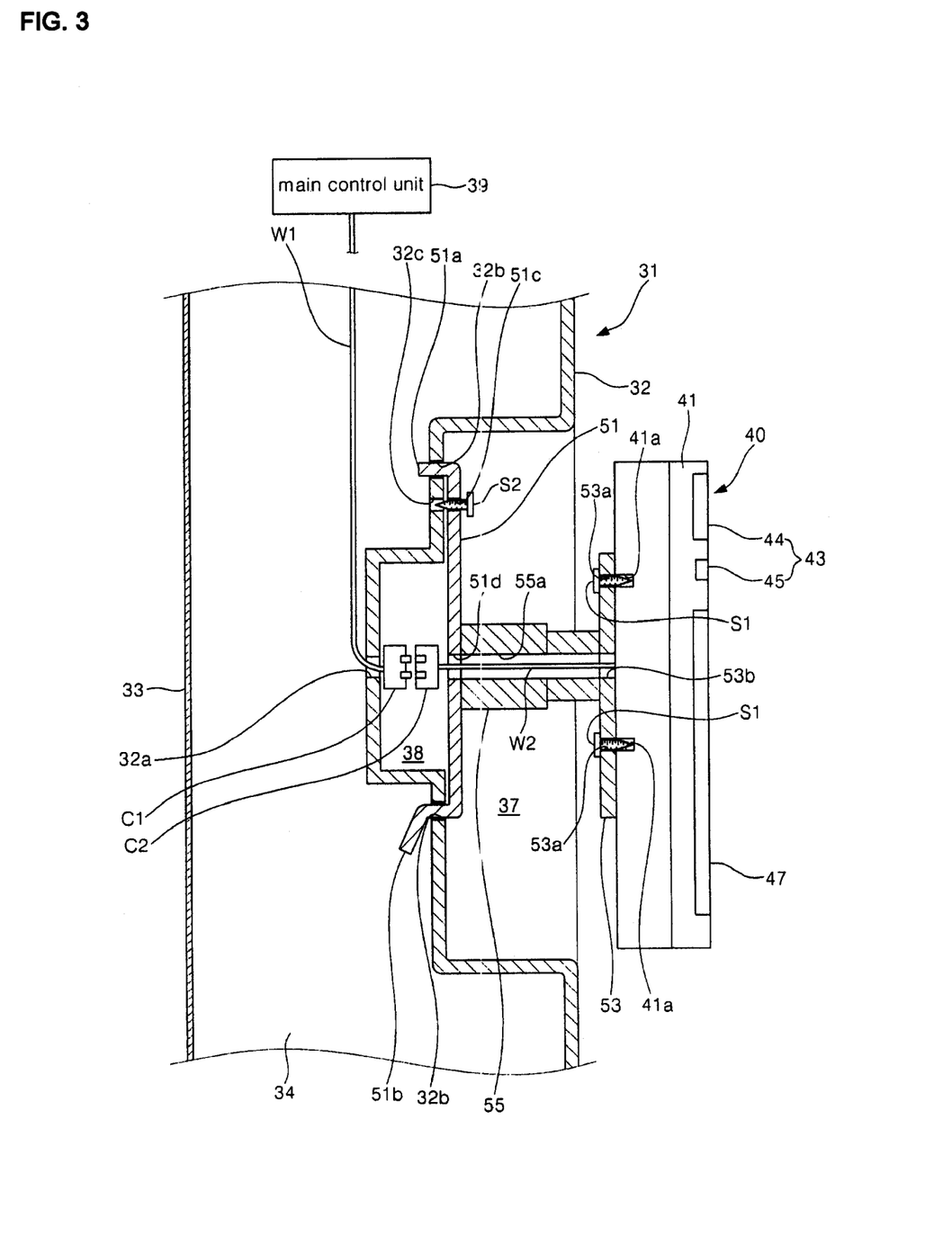
FIG. 3 is a sectional view showing a preferred embodiment of a mounting structure for a display unit according to the present invention.
Figure 4:
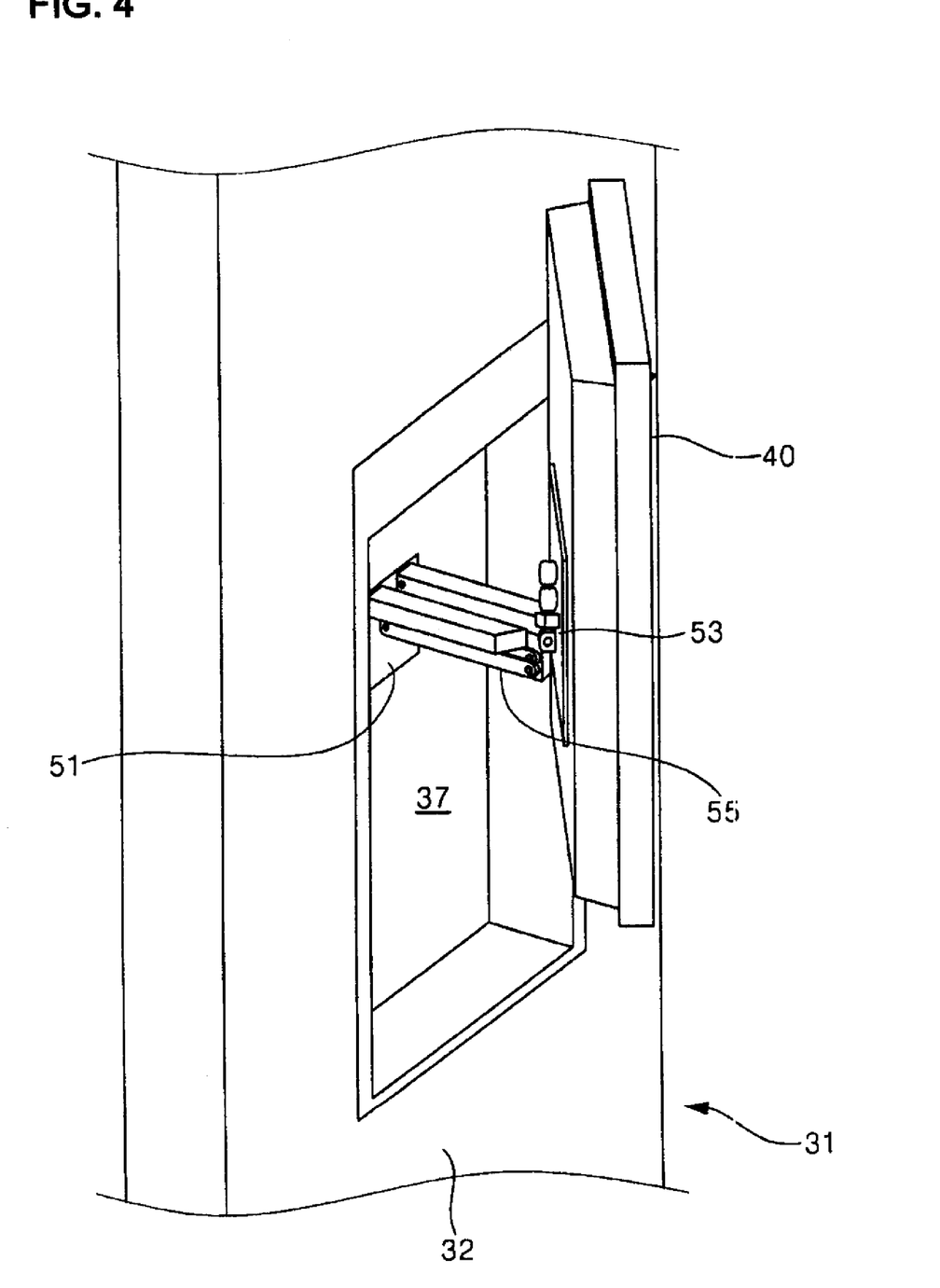
FIG. 4 is a perspective view of the embodiment shown in FIG. 3.

FIG. 3 shows a preferred embodiment of a mounting structure for a display unit in a refrigerator according to the present invention, and FIG. 4 is a perspective view of the embodiment shown in FIG. 3.

As shown in the figures, a front appearance of a refrigerator door 31 is defined by an outdoor part 32. A rear appearance of the refrigerator door 31 is defined by a door liner 33. Foam liquid is injected into a space defined between the outdoor part 32 and the door liner 33 to form an insulation layer 34.

An accommodating space 37 is provided at a side on a front surface of the refrigerator door 31. A display unit 40, which will be described below, is retractably installed in the accommodating space 37. The accommodating space 37 is formed by depressing a portion of the outdoor part 32 toward the interior of the refrigerator door 31.

A installation space 38 is provided at a side on a bottom surface defining the accommodating space 37. The installation space 38 is formed by relatively further depressing a portion of the bottom surface of the accommodating space 37 toward the interior of the refrigerator door 31. The installation space 38 is open forward to communicate with the accommodating space 37. First and second lead wires W1 and W2, which will be described below, are led into the installation space 38. To this end, an inlet opening 32a through which the first lead wire W1 is led is formed at a side of the outdoor part 32 corresponding to a bottom surface defining the installation space 38.

Coupling slots 32b are formed at positions on the bottom surface defining the accommodating space 37 in the vicinity of upper and lower sides of the installation space 38, respectively. Each of the coupling slots 32b is formed by cutting out a portion of the outdoor part 32, which corresponds to the bottom surface defining the accommodating space 37, such that the coupling slot is elongated in a lateral direction. A coupling opening 32c is formed at a portion of the outdoor part 32, which corresponds to the bottom surface defining the accommodating space 37, in the vicinity of any one of the coupling slots 32b. The coupling slots 32b and the coupling opening 32c are used to fix a bracket 51 that will be described below.

The display unit 40 is retractably installed in the accommodating space 37. A casing 41 defines an appearance of the display unit 40. A plurality of openings and holes are formed in a front surface of the casing 41. An installation space is provided inside the casing 41. A pair of coupling openings 41a are formed in a rear surface of the casing 41. The coupling openings 41a are used to fix a mounting plate 53 that will be described below.

A control unit 43 is installed mounted at an upper portion of the installation space of the casing 41. The control unit 43 comprises a display section 44 for displaying a variety of information related to the operation of the refrigerator, and an input section 45 for receiving a variety of operational input signals for the operation of the refrigerator. The control unit 43 is exposed to the outside through the openings and/or holes formed in the front surface of the casing 41.

A communication unit 47 is installed at a lower portion of the installation space of the casing 41, which is below the control unit 43. The communication unit 47 is exposed to the outside through the openings and/or holes formed in the front surface of the casing 41. The communication unit 47 outputs various images or sounds or displays information via the Internet, and also receives a variety of operational input signals. For example, a television kit for use in watching a television broadcast or a tablet computer for accessing to the Internet may be used as the communication unit 47.

Further, as shown in FIG. 4, speaker holes 49 are formed at a side of the front surface of the casing 41. Sounds outputted from the control unit 43 or the communication unit 47 can be transmitted to the outside through the speaker holes 49.

Meanwhile, the display unit 40 is connected by the first and second lead wires W1 and W2 to a main control unit 39 provided on a top surface of a refrigerator body (not shown). The display unit 40 is supplied with power or various electric signals from the main control unit 39 through the first and second lead wires W1 and W2. Although one end of the first lead wire W1 is connected to the main control unit 39 in the illustrated embodiment, it is possible to consider that the first lead wire W1 is connected directly to an external power supply for supplying power to the display unit 40.

The end of the first lead wire W1 is connected to the main control unit 39. The other end of the first lead wire W1 is led into the installation space 38 while sequentially passing through a hinge (not shown) for pivotally supporting the refrigerator door 31 with respect to the refrigerator body and the refrigerator door 31. One end of the second lead wire W2 is connected to the display unit 40. The other end of the second lead wire W2 is led into the installation space 38 through a link mechanism that will be described below.

The other ends of the first and second lead wires W1 and W2 led into the installation space 38 are provided with connectors C1 and C2, respectively. The other end of the first lead wire W1 is provided with a male connector C1. The other end of the second lead wire W2 is provided with a female connector C2. By connecting the connectors C1 and C2 to each other, the main control unit 39 is connected to the display unit 40.

The link mechanism is provided to tiltably support the display unit 40, which has been withdrawn out of the accommodating space 37, at a certain angle. The link mechanism comprises the bracket 51 fixed to the bottom surface defining the accommodating space 37, the mounting plate 53 fixed to the rear surface of the display unit 40, and a link member 55 of which both ends are pivotally connected to the bracket 51 and the mounting plate 53, respectively.

The bracket 51 is fixed to the bottom surface defining the accommodating space 37 to cover an open front face of the installation space 38. To this end, a fixing piece 51a and a coupling piece 51b are provided at upper and lower ends of the bracket 51, respectively. The fixing piece 51a and the coupling piece 51b are inserted into the respective coupling slots 32b in the accommodating space 37. The fixing piece 51a extends rearward perpendicularly to a rear surface of the bracket 51 at the upper end thereof. The coupling piece 51b extends rearward perpendicularly to the rear surface of the bracket 51 at the lower end thereof and has a leading end bent to be declined in a downward direction.

A through-hole 51c is formed at a portion of the bracket 51 corresponding to the coupling opening 32c in the accommodating space 37, i.e., at a portion of the bracket 51 close to the fixing piece 51a. A fastener S2 passes through the through-hole 51c of the bracket 51 and is fastened to the coupling opening 32c in the accommodating space 37.

An inlet opening 51d is formed at a side of the bracket 51. The inlet opening 51d serves as an inlet through which the end of the second lead wire W2 is led into the installation space 38.

A pair of through-holes 53a are formed in the mounting plate 53. A fastener S2 passes through each of the through-holes 53a of the mounting plate 53 and is fastened to the coupling opening 41a of the display unit 40.

Further, an outlet opening 53b is formed at a side of the mounting plate 53. The outlet opening 53b serves as an outlet through which the other end of the second lead wire W2 with the one end connected to the display unit 40 is led into the link member 55.

Both ends of the link member 55 are rotated relatively with respect to the bracket 51 or the mounting plate 53 so that the link member can function to allow the display unit 40 to be substantially tilted upward/downward or rightward/leftward. A channel 55a is provided longitudinally through link member 55. The second lead wire W2 led out through the outlet opening 53b of the mounting plate 53 passes through the channel 55a. The second lead wire W2 passing through the channel 55a is led through the inlet opening 51d of the bracket 51 into the installation space 38.

A process of mounting the display unit will be described in detail below in connection with the preferred embodiment of the mounting structure for the display unit in a refrigerator according to the present invention.

First, when the refrigerator door 31 is constructed, the one end of the first lead wire W1 is led through the interior of the refrigerator door 31 into the installation space 38. This is achieved by forming the insulation layer 34 through injection of foam liquid into a space defined between the outdoor part 32 and the door liner 33 of the refrigerator door 31 in a state where the one end of the first lead wire W1 passes through the space defined between the outdoor part 32 and the door liner 33 and is then led into the installation space 38. At this time, the other end of the first lead wire W1 is connected to the main control unit 39. Meanwhile, the other end of the first lead wire W1 led into the installation space 38 is terminated with the male connector C1.

Next, the one end of the second lead wire W2 is connected to a side of the display unit 40. Then, the pre-assembled link mechanism is fixed to the display unit 40. At this time, the other end of the second lead wire W2 passes through the interior of the link device, i.e., the outlet opening 53b of the mounting plate 53, the channel 55a of the link member 55 and the inlet opening 51d of the bracket 51 in sequence. The other end of the second lead wire W2 that has passed through the link mechanism in such a manner is terminated with the female connector C2.

Then, the female connector C2 is connected to the male connector C1 positioned in the installation space 38. In the state where the connectors C1 and C2 are connected to each other in the installation space 38, the bracket 51 is fixed to the bottom surface defining the accommodating space 37. Accordingly, the mounting of the display unit is completed.

Then, a procedure for using the display unit mounted by means of the preferred embodiment of the mounting structure for a display unit in a refrigerator according to the present invention will be described.

First, the display unit 40 is tilted at a certain angle depending on the position of a user. To this end, the display unit 40 accommodated in the accommodating space 37 is pulled forward to be withdrawn out of the accommodating space 37. Then, the display unit 40 is moved upward/downward or rightward/leftward to be tilted at a certain angle. The tilting of the display unit 40 is achieved by the link mechanism.

The first and second lead wires W1 and W2 for supplying power and electric signals to the display unit 40 pass through the link mechanism are connected to each other within the installation space 38. Accordingly, in the state where the display unit 40 is withdrawn out of the accommodating space 37, the first and second lead wires W1 and W2 and the connectors C1 and C2, which are provided at the ends of the first and second lead wires W1 and W2 and connected to each other, are not exposed outside.

Hereinafter, another embodiment of a mounting structure for a display unit in a refrigerator according to the present invention will be described in detail with reference to the accompanying drawings.

Figure 5:
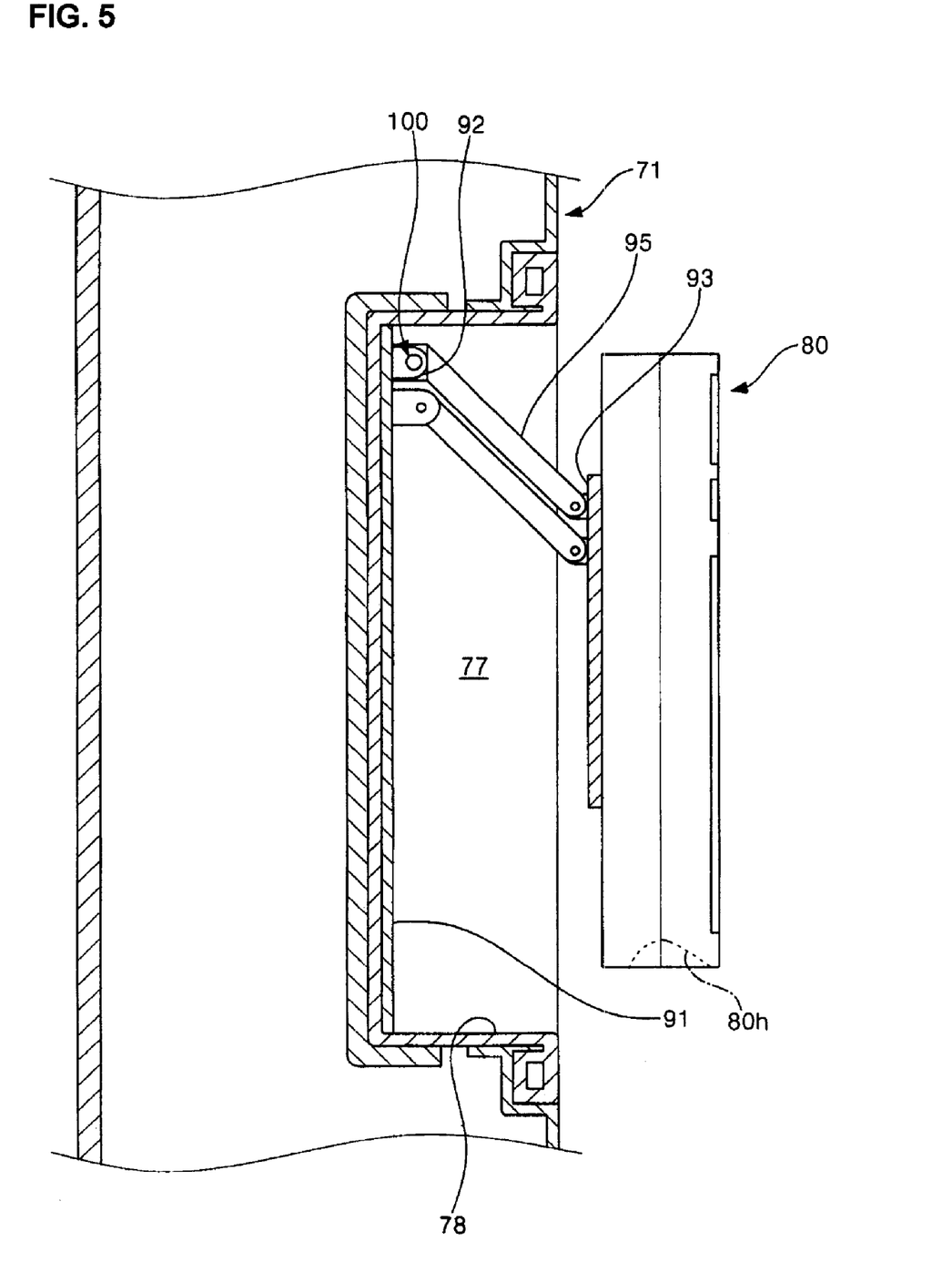
FIG. 5 is a sectional view showing another embodiment of a mounting structure for a display unit according to the present invention.
Figure 6:
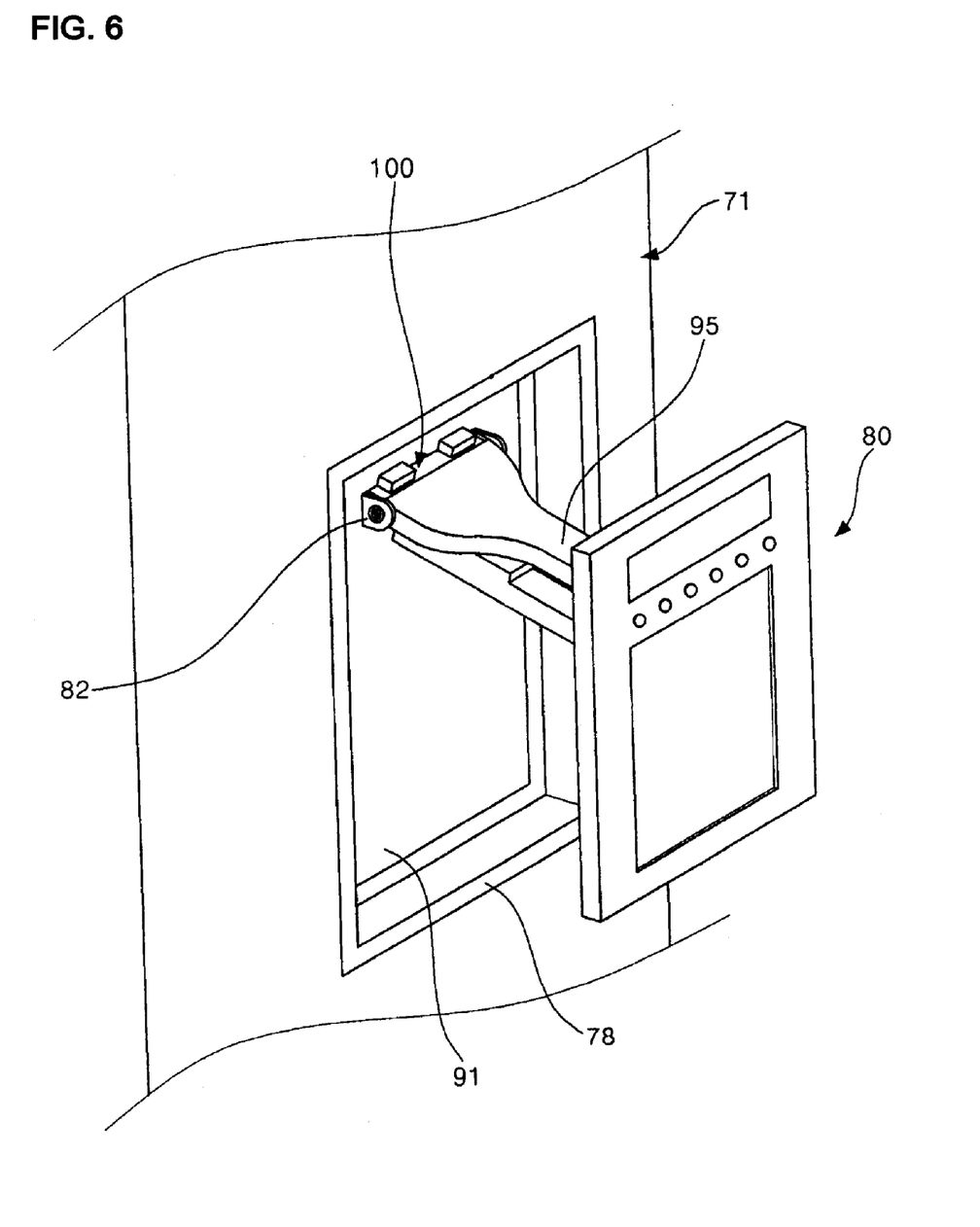
FIG. 6 is a perspective view showing the display unit and mounting structure which constitute the embodiment shown in FIG. 5.

FIG. 5 shows another embodiment of a mounting structure for a display unit according to the present invention, and FIG. 6 shows a display unit and a mounting mechanism in this embodiment shown in FIG. 5.

As shown in the figures, an accommodating space 77 is provided in a front surface of a refrigerator door 71. The accommodating space 77 is formed by depressing a portion of the front surface of the refrigerator door 71 toward the interior of the refrigerator door 71. In the illustrated embodiment, the accommodating space 77 is formed by means of a recess member 78 that is provided in the front surface of the refrigerator door 71.

A display unit 80 is retractably installed in the accommodating space 77. In a state where the display unit 80 is accommodated in the accommodating space 77, it is preferred that a lower side of the accommodating space 77 is spaced apart from a lower surface of the display unit 80 by a certain distance.

A handle 80h is provided on the lower surface of the display unit 80. The handle 80h is a part grasped by a user with his/her hand in order to withdraw the display unit 80 out of the accommodating space 77. The handle 80h may be formed by inwardly depressing a portion of the lower surface of the display unit 80.

Since the configuration of the display unit 80 for displaying a variety of information and for inputting operational signals therethrough in the embodiment of FIG. 5 is the same as the display unit 40 in the embodiment of FIGS. 2 and 3, a detailed description of the display unit 80 will be omitted.

A link mechanism is provided to support the display unit 80 when the display unit 80 is withdrawn out of the accommodating space 77. The link mechanism comprises a bracket 91 fixed to a bottom surface defining the accommodating space 77; a mounting plate 93 fixed to a rear surface of the display unit 80; a pair of link members 95 and 97 each of which has both ends pivotally connected respectively to the bracket 91 and the mounting plate 93; and a hinge assembly 100 provided at a side of the bracket 91 to rotate one link member 95 of the link members 95 and 97 in a direction in which the display unit 80 is withdrawn out of the accommodating space 77.

The mounting plate 93 and the bracket 91 may be fixed to the bottom surface defining the accommodating space 77 or to the rear surface of the display unit 80 by means of an additional fastener (not shown). At least one mounting flange 92 is provided at a front surface of the bracket 91. The mounting flange 92 is used to fix the hinge assembly 100. The mounting flange 92 may be formed integrally with the bracket 91 or separately therefrom and then fixed to the front surface of the bracket 91.

The hinge assembly 100 functions to apply an external force to one of the link members in the direction in which the display unit 80 is withdrawn out of the accommodating space 77. More specifically, the hinge assembly 100 functions to rotate the link member 95 in the direction in which the display unit 80 is withdrawn out of the accommodating space 77. Hereinafter, the structure of the hinge assembly 100 will be described in greater detail with reference to the accompanying drawings.

Figure 7:
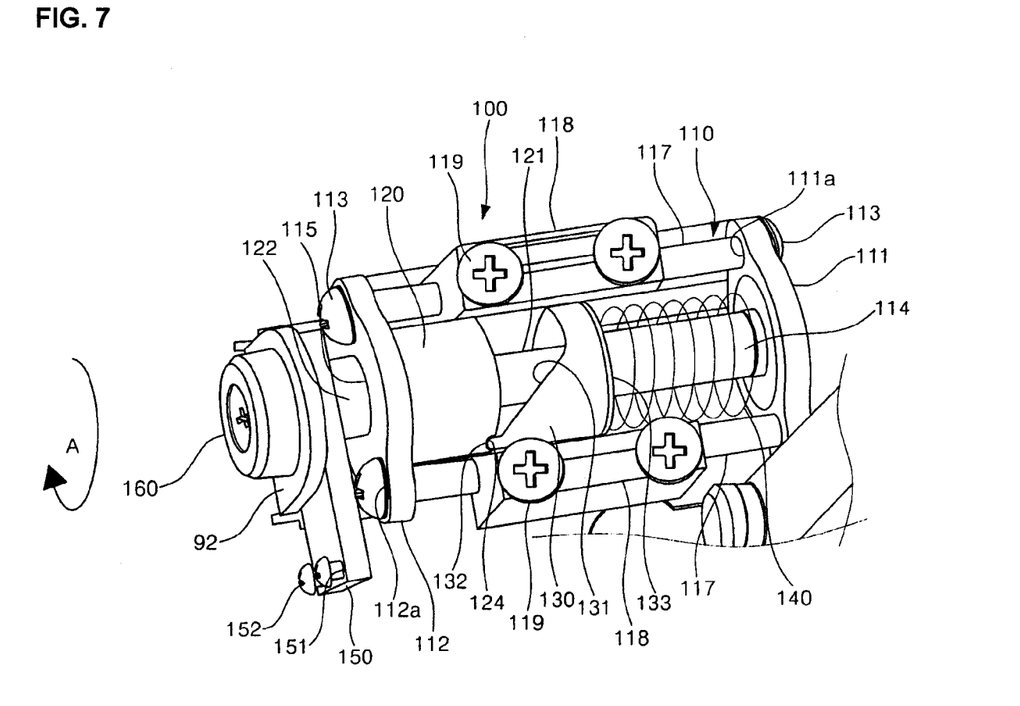
FIG. 7 is a perspective view showing a state of a hinge assembly when the display unit is received in an accommodating space in the embodiment shown in FIG. 5.
Figure 8:
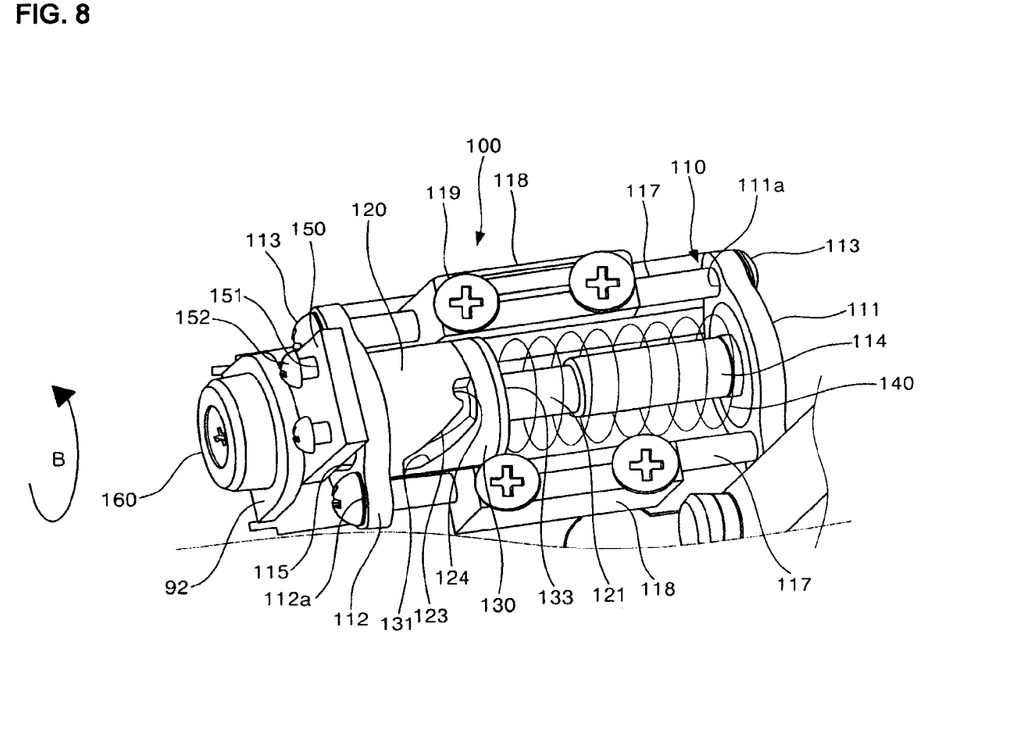
FIG. 8 is a perspective view showing a state of the hinge assembly when the display unit is withdrawn from the accommodating space in the embodiment shown in FIG. 5.

FIG. 7 shows the state of the hinge assembly when the display unit is accommodated in the accommodating space in the embodiment of FIG. 5, and FIG. 8 shows the state of the hinge assembly when the display unit is withdrawn from the accommodating space in the embodiment of FIG. 5.

As shown in the figures, a frame 110 of the hinge assembly 100 comprises a pair of support plates 111 and 112 and a pair of support bars 117 to support the support plates 111 and 112 therebetween. Both ends of each of the support bars 117 are fixed to opposite sides of the support plates 111 and 112, respectively. At this time, the both ends of each of the support bars 117 are fixed to edge portions of the opposite sides of the support plates 111 and 112, respectively. Thus, a certain space, i.e., a space enclosed by the support plates 111 and 112 and the support bars 117, is formed inside the frame 110.

A plurality of through-holes 111a and 112a are formed at corresponding positions on the support plates 111 and 112, respectively. The through-holes 111a and 112a are used to fix the support bars 117. That is, fasteners 113 pass through the through-holes 111a and 112a and are then fastened to the both ends of each of the support bars 117, so that the support plates 111 and 112 and the support bars 117 can be fixed to each other.

Hereinafter, for the sake of convenience of description, the right support plate 111 of the support plates 111 and 112 will be referred to as "first support plate," while the left support plate 112 of the support plates 111 and 112 will be referred to as "second support plate". A hollow guide boss 114 is provided on the first support plate 111. The guide boss 114 extends perpendicularly to one side of the first support plate 111 toward one side of the second support plate 112 by a predetermined length. A through-hole 115 is formed in the second support plate 112.

A coupling section 118 is provided at the support bar 117. The coupling section 118 is used to fix the hinge assembly 100 to the bracket 91. To this end, a plurality of through-holes (not shown) may be formed in the coupling section 118. A fastener 119 passes through the through-hole of the coupling section 118 and is then fastened to the bracket 91.

A rotary cam 120 is provided inside the frame 110. The rotary cam 120 is reciprocally rotated within a predetermined angular range so as to substantially rotate the link member 95 in the direction in which the display unit 80 is withdrawn out of the accommodating space 77. To this end, the rotary cam 120 is reciprocally rotated within the predetermined angular range in cooperation with a linearly reciprocating motion of a sliding cam 130 that will be described below.

FIG. 7 shows the state of the rotary cam 120 when the display unit 80 is accommodated in the accommodating space 77. FIG. 8 shows the state of the rotary cam 120 when the display unit 80 is withdrawn out of the accommodating space 77.

A rotational shaft 121 and a connection shaft 122 are provided at both sides of the rotary cam 120, respectively. The rotational shaft 121 and the connection shaft 122 extend perpendicularly to the both sides of the rotary cam 120 by predetermined lengths, respectively. The rotational shaft 121 is rotatably coupled into the guide boss 114. The connection shaft 122 passes through the through-hole 115 of the second support plate 112.

As specifically shown in FIG. 8, a cam surface 123 is formed on the rotary cam 120. The cam surface 123 of the rotary cam 120 is formed to be slanted at a predetermined angle from one side of the rotary cam 120 close to the first support plate 111 toward the other surface of the rotary cam 120 close to the second support plate 112. A locking groove 124 is formed at an end of the cam surface 123 of the rotary cam 120 close to the first support plate 111.

The sliding cam 130 is slidably installed on the rotational shaft 121. The sliding cam 130 linearly reciprocates along the rotational shaft 121 to cause the rotary cam 120 to be reciprocally rotated in the direction in which the display unit 80 is accommodated in the accommodating space 77 or the display unit 80 is withdrawn out of the accommodating space 77.

The sliding cam 130 is adapted to be only linearly moved without being rotated together with the rotational shaft 121. To this end, the rotational shaft 121 and the sliding cam 130 are installed to be rotated relative to each other. Although not shown in the figures, a guide groove may be formed on an outer peripheral surface of the support bar 117 to guide the linear motion of the sliding cam 130, and a guide protrusion that is to be slidably inserted into the guide groove may be provided on an outer peripheral surface of the sliding cam 130.

The sliding cam 130 is provided with a cam surface 131 that complementarily matches the cam surface 123 of the rotary cam 120 in view of their shapes. The cam surface 131 of the sliding cam 130 is formed to be slanted at a predetermined angle from one surface of the sliding cam 130 close to the second support plate 112 toward the other surface of the sliding cam 130 close to the first support plate 111.

A locking protrusion 132 is provided at an end of the cam surface 131 of the sliding cam 130 close to the second support plate 112. The locking protrusion 132 and the locking groove 124 serve to selectively restrain the rotation of the rotary cam 120 for withdrawing the display unit 80 out of the accommodating space 77.

That is, in the state where the display unit 80 is accommodated in the accommodating space 77, the locking protrusion 132 is inserted into the locking groove 124, as shown in FIG. 7. Thus, the rotation of the rotary cam 120 in cooperation with the linear motion of the sliding cam 130 is restrained. Since the link member 95 that is in cooperation with the rotation of the rotary cam 120 cannot be rotated, the display unit 80 is prevented from being arbitrarily withdrawn from the accommodating space 77.

Meanwhile, if an external force is applied to the display unit 80 accommodated in the accommodating space 77 in the direction in which the display unit 80 is withdrawn out of the accommodating space 77, the locking protrusion 132 escapes from the locking groove 124, as shown in FIG. 8. Thus, the rotary cam 120 is rotated in cooperation with the linear motion of the sliding cam 130. As the link member 95 is rotated in cooperation with the rotation of the rotary cam 120, the display unit 80 is withdrawn out of the accommodating space 77.

A support flange 133 is provided at one surface of the sliding cam 130 close to the first support plate 111. One end of a coil spring 140, which will be described below, is supported by the support flange 133. The support flange 133 can radially extend from the surface of the sliding cam 130 depending on the size of the coil spring 140.

The coil spring 140 is provided to enclose the guide boss 114 and the rotational shaft 121. The coil spring 140 applies an elastic force to the sliding cam 130 in a sliding direction of the sliding cam 130 so that the rotary cam 120 can be rotated in the direction in which the display unit 80 is withdrawn out of the accommodating space 77. To this end, both ends of the coil spring 140 are supported by one surface of the first support plate 111 and the support flange 133 of the sliding cam 130, respectively.

It is preferred that the coil spring 140 apply a predetermined elastic force to the sliding cam 130 regardless of the accommodation or withdrawal of the display unit 80. This is to maintain the state where the display unit 80 is withdrawn out of the accommodating space 77.

A link mounting plate 150 is fixed to the connection shaft 122. The link mounting plate 150 serves to connect the rotary cam 120 and the link member 95 to each other so that the link member 95 can be rotated in cooperation with the rotation of the rotary cam 120. To this end, the link mounting plate 150 is fixed to the connection shaft 122.

A pair of through-holes 151 are formed in the link mounting plate 150. A fastener passes through each of the through-holes 151 of the link mounting plate 150 and is then fastened to one end of the link member 95. In the illustrated embodiment, the link mounting plate 150 is formed separately from the link member 95. However, it is possible to fix the end of the link member 95 directly to the connection shaft 122.

The mounting flange 92 of the bracket 91 is connected to the connection shaft 122 outside the link mounting plate 150. The mounting flange 92 is connected to the connection shaft 122 so that they can be rotated relative to each other.

A side cam 160 is fixed to a leading end of the connection shaft 122. The side cam 160 is screwed to the leading end of the connection shaft 122 to be rotated in cooperation with the rotation of the rotary cam 120.

Hereinafter, a process of withdrawing or accommodating the display unit, which is mounted by the mounting structure for the display unit in the refrigerator according to another embodiment of the present invention shown in FIG. 5, from or into the accommodating space will be described.

First, when the display unit 80 is received in the accommodating space 77, the hinge assembly 100 is in a state as shown in FIG. 7. That is, since the locking protrusion 132 of the sliding cam 130 is inserted into the locking groove 124 of the rotary cam 120, the sliding cam 130 is restrained from being rotated. Therefore, the display unit 80 is prevented from being inadvertently withdrawn from the accommodating space 77.

In order to take the display unit 80 received in the accommodating space 77 out of the accommodating space 77, a user grips the handle 80h of the display unit 80 with his/her hand and pulls the display unit 80 forward from the accommodating space 77. As such, the locking protrusion 132 is detached from the locking groove 124 due to a force for pulling the display unit 80 forward from the accommodating space 77. At this time, the magnitude of the force for pulling the display unit 80 forward from the accommodating space 77 is at least greater than the elastic force of the coil spring 140.

If the locking protrusion 132 is detached from the locking groove 124, the sliding cam 130 is linearly moved leftward as viewed from FIG. 7 due to the elastic force of the coil spring 140. As the sliding cam 130 is linearly moved, the cam surface 131 of the sliding cam 130 pushes the cam surface 123 of the rotary cam 120. Accordingly, the rotary cam 120 is rotated clockwise A as viewed from FIG. 7 in cooperation with the linear motion of the sliding cam 130.

The link mounting plate 150 is also rotated clockwise A in the same direction as the rotary cam 120 in cooperation with the rotation of the rotary cam 120. Accordingly, the link member 95 to which the link mounting plate 150 is fixed is also rotated clockwise A in the same direction as the link mounting plate 150, i.e. the rotary cam 120. The display unit 80 is withdrawn from the accommodating space 77 due to the rotation of the link member 95.

At this time, the hinge assembly 100 is in a state as shown in FIG. 8. The coil spring 140 continues to impart the elastic force to the sliding cam 130 leftward as viewed from FIG. 8, i.e. in a direction in which the sliding cam 130 is linearly moved to cause the rotary cam 120 to rotate such that the display unit 80 can be withdrawn from the accommodating space 77. Accordingly, unless an external force greater than the elastic force of the coil spring 140 is applied, the display unit 80 is still kept at a state where it has been withdrawn from the accommodating space 77.

On the other hand, a process of accommodating the display unit 80 into the accommodating space 77 is performed in an order reverse to the aforementioned withdrawer process. That is, the display unit 80 is pushed into the accommodating space 77 with a force greater than the elastic force of the coil spring 140. Accordingly, both the link member 95 and the rotary cam 120 are rotated counterclockwise B as viewed from FIG. 8.

As the rotary cam 120 is rotated as described above, the cam surface 123 of the rotary cam 120 pushes the cam surface 131 of the sliding cam 130 rightward as viewed from FIG. 8. Therefore, the sliding cam 130 is linearly moved rightward as viewed from FIG. 8.

When the display unit 80 is accommodated in the accommodating space 77, the locking protrusion 132 is inserted into the locking groove 124. Accordingly, since the rotary cam 120 is restrained from being rotated, the display unit 80 cannot be inadvertently withdrawn from the accommodating space 77.

According to the present invention so configured, the following advantages can be expected.

First, a plurality of components connected to the external power supply or the main control unit of the refrigerator for supplying electric power to or transmitting the plurality of electric signals the display unit, i.e. the lead wires and the connectors, are not exposed to the outside. Therefore, even though the display unit is withdrawn from the accommodating space of the door, an overall aesthetic sense of the refrigerator is not deteriorated.

Further, since the lead wires and the connectors for supplying electric power and/or transmitting the plurality of electric signals to the display unit are not exposed to the outside as described above, the lead wires and/or the connectors are prevented from being damaged while the display unit is being accommodated into or withdrawn from the accommodating space. Therefore, the durability and operational reliability of products can be improved.

Furthermore, if the display unit is pulled forward from the accommodating space with a predetermined force, the display unit can be withdrawn from the accommodating space due to the hinge assembly. Therefore, since the display unit can be more easily withdrawn or accommodated, the filed of view can be easily ensured regardless of the positions of the user. Accordingly, the usability of the display unit can be improved.

It is apparent to those skilled in the art that various modifications and changes thereto can be made within the fundamental technical spirit of the present invention. Therefore, the true scope of the present invention should be defined by the technical spirit of the appended claims.

What is claimed is:

1. A mounting structure for a display unit in a refrigerator, comprising:
    an accommodating space formed as a depression in a portion of a front surface of a door;
    a display unit retractably mounted to the accommodating space and including a display screen to display a variety of information, wherein the display unit is movable between an extended position and a retracted position with the display screen being visible and operable for display in both the extended position and the retracted position; and
    a link mechanism for guiding a withdrawal or accommodation motion of the display unit and for supporting the display unit withdrawn from the accommodating space to be tiltable at a predetermined angle,
    wherein the link mechanism includes:
    a bracket fixed to a bottom surface defining the accommodating space;
    a mounting plate fixed to a rear surface of the display unit; and
    a link member of which both ends are pivotally connected to a front surface of the bracket and a rear surface of the mounting plate, respectively.

2. A mounting structure for a display unit in a refrigerator, comprising:
    an accommodating space formed as a depression in a portion of a front surface of a door;
    a display unit retractably mounted to the accommodating space and including a display screen for displaying a variety of information, wherein the display unit is movable between an extended position and a retracted position with the display screen being visible and operable for display in both the extended position and the retracted position;
    a link mechanism for guiding a withdrawal or accommodation motion of the display unit and for supporting the display unit withdrawn from the accommodating space to be tiltable at a predetermined angle;
    a hinge assembly provided in the accommodating space or at a connection portion between the display unit and the link mechanism to impart an external force to the link mechanism in a direction in which the display unit is withdrawn; and
    a locking means for maintaining the display unit to be accommodated in the accommodating space against the external force from the hinge assembly.

3. The mounting structure as claimed in claim 2, wherein the link mechanism includes:
    a bracket fixed to a bottom surface defining the accommodating space;
    a mounting plate fixed to a rear surface of the display unit; and
    a link member of which both ends are pivotally connected to a front surface of the bracket and a rear surface of the mounting plate, respectively.

4. The mounting structure as claimed in claim 3, wherein the hinge assembly includes:
    a frame fixed to a portion of the bracket or mounting plate;
    a linearly reciprocating sliding cam installed at a side of the frame;
    a rotary cam installed at a side of the frame and rotatably reciprocating within a predetermined angular range in cooperation with the linear reciprocation of the sliding cam; and
    an elastic member provided at a side of the frame to impart a predetermined elastic force to the sliding cam, wherein when the sliding cam is linearly moved in a direction by the elastic force imparted by the elastic member, the link member is rotated in a direction in which the display unit is withdrawn from the accommodating space by the rotary cam rotating about a predetermined direction in cooperation with the liner reciprocation of the sliding cam.

5. The mounting structure as claimed in claim 4, wherein the locking means includes:
   a locking protrusion provided at one of a position on the sliding cam and a corresponding position on the rotary cam; and
   a locking groove provided at the other of the position on the sliding cam and the corresponding position on the rotary cam such that the locking protrusion is inserted in the locking groove when the display unit is withdrawn from the accommodating space, and the locking protrusion is detached from the locking groove when the display unit is received in the accommodating space.

6. The mounting structure as claimed in claim 2, wherein a handle is provided on a lower surface of the display unit, and a lower side of the accommodating space is spaced apart from the lower surface of the display unit by a predetermined distance when the display unit is received in the accommodating space.

7. A mounting structure for a display unit in a refrigerator, comprising:
   an accommodating space formed as a depression in a portion of a front surface of a door;
   an installation space formed in the door to communicate with a portion of the accommodating space;
   a display unit retractably mounted to the accommodating space and including a display screen to display a variety of information, wherein the display unit is movable between an extended position and a retracted position with the display screen being visible and operable for display in both the extended position and the retracted position;
   a first lead wire of which one end is led into the installation space through the door;
   a second lead wire of which one end is connected to the display unit and the other end is led into the installation space and connected to the first lead wire;
   a link mechanism for guiding a withdrawal or accommodation motion of the display unit and for supporting the display unit withdrawn from the accommodating space to be tiltable at a predetermined angle;
   a hinge assembly provided in the accommodating space or at a connection portion between the display unit and the link mechanism to impart an external force to the link mechanism in a direction in which the display unit is withdrawn; and
   a locking means for maintaining the display unit to be accommodated in the accommodating space against the external force imparted by the hinge assembly.

8. The mounting structure as claimed in claim 7, wherein the link mechanism includes:
   a bracket fixed to a bottom surface defining the accommodating space;
   a mounting plate fixed to a rear surface of the display unit; and a link member of which both ends are pivotally connected to a front surface of the bracket and a rear surface of the mounting plate, respectively.

9. The mounting structure as claimed in claim 8, wherein the installation space is formed as a depression in a portion of a bottom surface defining the accommodating space toward the interior of the door, and the bracket covers a front face of the installation space communicating with the accommodating space.

10. The mounting structure as claimed in claim 9, wherein an outlet opening through which an end of the second lead wire is led out is formed at a position of the mounting plate, a channel through which the second lead wire led out through the outlet opening passes is formed through the link member, and an inlet opening through which the second lead wire passing through the channel of the link member is led into the installation space is formed in the bracket.

11. The mounting structure as claimed in claim 10, wherein mating connectors are provided at ends of the first and the second lead wires led into the installation space, respectively.

12. The mounting structure as claimed in claim 8, wherein the hinge assembly includes:
   a frame fixed to a portion of the bracket or mounting plate;
   a linearly reciprocating sliding cam installed at a side of the frame;
   a rotary cam installed at a side of the frame and rotatably reciprocating within a predetermined angular range in cooperation with the linear reciprocation of the sliding cam; and
   an elastic member provided at a side of the frame to impart a predetermined elastic force to the sliding cam, wherein when the sliding cam is linearly moved in a direction by the elastic force imparted by the elastic member, the link member is rotated in a direction in which the display unit is withdrawn from the accommodating space by the rotary cam rotating about a predetermined direction in cooperation with the liner reciprocation of the sliding cam.

13. The mounting structure as claimed in claim 12, wherein the locking means includes:
   a locking protrusion provided at one of a position on the sliding cam and a corresponding position on the rotary cam; and
   a locking groove provided at the other of the position on the sliding cam and the corresponding position on the rotary cam such that the locking protrusion is inserted in the locking groove when the display unit is withdrawn from the accommodating space, and the locking protrusion is detached from the locking groove when the display unit is received in the accommodating space.

14. The mounting structure as claimed in claim 7, wherein a handle is provided on a lower surface of the display unit, and a lower side of the accommodating space is spaced apart from the lower surface of the display unit by a predetermined distance when the display unit is received in the accommodating space.

15. A mounting structure for a display unit in a refrigerator comprising:
   an accommodating space formed as a depression in a portion of a front surface of a door;
   a display unit retractably mounted to the accommodating space and including a display screen to display a variety of information, wherein the display unit is movable between an extended position and a retracted position with the display screen being visible and operable for display in both the extended position and the retracted position;
   a link mechanism for guiding a withdrawal or accommodation motion of the display unit and for supporting the display unit withdrawn from the accommodating space to be tiltable at a predetermined angle; and
   an installation space formed in the door to communicate with a portion of the accommodating space.

16. The mounting structure as claimed in claim 15, wherein the installation space is formed as a depression in a portion of a bottom surface defining the accommodating space toward the interior of the door.

17. The mounting structure as claimed in claim 16, wherein the link mechanism includes:
- a bracket fixed to a bottom surface defining the accommodating space;
- a mounting plate fixed to a rear surface of the display unit; and
- a link member of which both ends are pivotally connected to a front surface of the bracket and a rear surface of the mounting plate, respectively.

18. The mounting structure as claimed in claim 17, wherein the bracket covers a front face of the installation space communicating with the accommodating space.

19. The mounting structure as claimed in claim 17, further comprising:
- a first lead wire of which one end is led into the installation space through the door; and
- a second lead wire of which one end is connected to the display unit and the other end is led into the installation space and connected to the first lead wire, wherein an outlet opening through which an end of the second lead wire is led out is formed at a position of the mounting plate, a channel through which the second lead wire led out through the outlet opening passes is formed through the link member, and an inlet opening through which the second lead wire passing through the channel of the link member is led into the installation space is formed in the bracket.

20. The mounting structure as claimed in claim 19, wherein mating connectors are provided at ends of the first and the second lead wires led into the installation space, respectively.

21. The mounting structure as claimed in claim 15, further comprising:
- a first lead wire of which one end is led into the installation space through the door; and
- a second lead wire of which one end is connected to the display unit and the other end is led into the installation space and connected to the first lead wire.

* * * * *